UNITED STATES PATENT OFFICE.

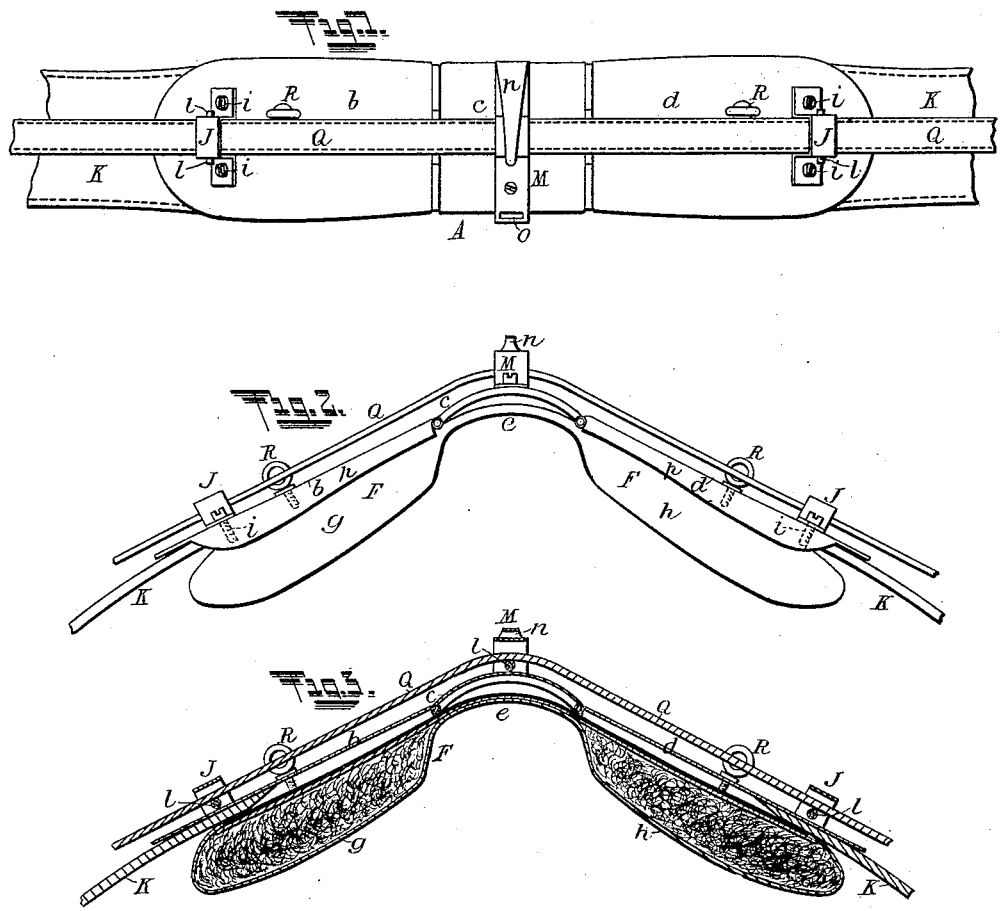

FREDRICK REHKOPF, OF MEMPHIS, TENNESSEE.

HARNESS-SADDLE.

SPECIFICATION forming part of Letters Patent No. 379,605, dated March 20, 1888.

Application filed July 30, 1887. Serial No. 245,742. (No model.)

*To all whom it may concern:*

Be it known that I, FREDRICK REHKOPF, of Memphis, in the county of Shelby and State of Tennessee, have invented certain new and useful Improvements in Harness-Saddles; and I do hereby declare that the following is a full, clear, and exact description of the invention, which will enable others skilled in the art to which it appertains to make and use the same, reference being had to the accompanying drawings, and to letters of reference marked thereon, which form a part of this specification.

My improvements relate to means which I have provided whereby the saddle can adjust itself in shape to animals of any size and permitting the pads to work without bringing down its center upon the backbone of the animal; to devices combined with the "bearing-strap" whereby it may work easily from one side to the other of the saddle without moving, pulling, or displacing it, and to other particulars, hereinafter stated.

In the drawings, Figure 1 represents a top view; Fig. 2, a side view, and Fig. 3 a central cross-section.

A is the metallic pad-plate, made in three parts, $b\ c\ d$, hinged or jointed together, the upper and central part, $c$, reaching over the thinner and flexible part, $e$, of the pad F, which spans the backbone of the animal, this part $c$ connecting with the thicker portions, $g\ h$, which lie on either side of the backbone when the harness is in use. This flexible part $e$ is not directly fastened to the metal part $c$, and is free to give and yield under the movements of the animal, or to adapt itself to any closing or spreading of the parts $g\ h$ to accord with the size or motions of the animal. The thicker parts, $g\ h$, are, however, secured in part by screws $i\ i$, which serve to secure to place the metal loops J J, such screws also passing through and holding to place the "skirts" K K, which have the upper ends inserted between the pads and the side plates, $b\ d$. These loops J have each a friction-roller, $l$, at their lower part, as has also the top loop, M, on the center plate, $c$, and this last-named loop is provided with a hook, $n$, serving as the "pad-hook," and at its opposite end with a loop or eye, $o$, for a back-strap. This top loop is fastened by screws to the center plate, $c$, only.

The hinged plates $b\ d$ are each made with flanges $p\ p$, which partially cover the edges of the pads, as shown, and also wholly cover the edges of the upper ends of the skirts K, thus not only protecting such edges as well as avoiding sharp exposed edges of metal, but also firmly securing the pads to their proper place, besides affording a much neater and more attractive finish.

Q is the bearing-strap, which is passed through the loops J J and M, and rests loosely on their respective friction-rollers $l$. This permits such strap to work easily under any movement or swing of the shafts, or any movement of the horse, shifting readily from side to side without any displacement of the saddle, while at the same time the strap cannot itself get out of place, being always within the loops, and the wear and strain on it are by this arrangement very much lessened, and the effect is also vastly to relieve the horse or other animal from strain and sudden jerks and prevent injury to him.

Terrets R are inserted through the side plates, $b\ d$, respectively, and are secured to the pad. They are so located, however, as not to be in the line or path of the bearer-strap, and consequently do not come in contact with it. They also serve in holding the pad to the plates.

From the above it will be evident that the hinges allow the saddle to be adjusted or to adjust itself to the form of the animal wearing this saddle and contribute largely to his comfort, and that much annoyance and pain will be saved him by this feature, as well as from the free easy play of the shaft-bearing strap and the prevention of violent jerking of the shafts.

The relation of the friction-rollers and loose back-strap to the hinged plate permits any movement of the horse without restraint from either the back-strap or from the saddle. The friction-rollers, located at both sides as well as on top, serve to keep the back-strap from needless rubbing and wear, and especially from dirt lodging between them. The placing of the rollers inside the loops not only houses and protects them, but also economizes the construction, inasmuch as the loop itself serves for the bearings of the rollers.

I claim—

1. In combination with the pad herein described, having the flexible central connection, c, the metallic pad-plate made in three parts, hinged together, and provided with the loops and their friction-rollers, all substantially as set forth.

2. In combination with the central part, c, of the hinged pad-plate, the top loop, M, secured thereto and provided with its friction-roller, and having a hook at one extremity and an eye or loop at its other extremity, substantially as set forth.

3. In combination with the pad herein described, the metallic pad-plate made in three parts, hinged together and provided with the loops and their friction-rollers, all substantially as set forth.

4. In combination, the described hinged plate with its loops and rollers, the pad and skirts secured thereto by the screws which fasten the loops, the back-strap playing loosely in the loops, and the terrets located at the side of such strap, all substantially as set forth.

FREDRICK REHKOPF.

Witnesses:
CHAS. A. BURR,
NAT. GOLDSTEIN,
W. C. TRASK,
JOSIAH T. SETTLE.